US009323684B2

(12) United States Patent
Koker et al.

(10) Patent No.: US 9,323,684 B2
(45) Date of Patent: Apr. 26, 2016

(54) DYNAMIC CACHE AND MEMORY ALLOCATION FOR MEMORY SUBSYSTEMS

(71) Applicant: Intel Corporation, Santa Clara, CA (US)

(72) Inventors: Altug Koker, El Dorado Hills, CA (US); Aditya Navale, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 47 days.

(21) Appl. No.: 14/221,491

(22) Filed: Mar. 21, 2014

(65) Prior Publication Data

US 2015/0269083 A1 Sep. 24, 2015

(51) Int. Cl.
*G09G 5/36* (2006.01)
*G06T 1/60* (2006.01)
*G06F 12/08* (2006.01)

(52) U.S. Cl.
CPC ........ *G06F 12/0871* (2013.01); *G06F 12/0875* (2013.01); *G09G 2360/121* (2013.01)

(58) Field of Classification Search
None
See application file for complete search history.

(56) References Cited

U.S. PATENT DOCUMENTS

| 8,212,832 | B2 * | 7/2012 | Stefanidis | ................. G06T 1/60 345/543 |
| 2010/0274974 | A1 * | 10/2010 | Van De Waerdt | ........ G09G 5/39 711/136 |
| 2012/0254548 | A1 * | 10/2012 | Comparan | .......... G06F 12/0891 711/135 |
| 2014/0049548 | A1 * | 2/2014 | Rao | ........................ G06T 11/60 345/502 |

* cited by examiner

*Primary Examiner* — Jacinta M Crawford
(74) *Attorney, Agent, or Firm* — Garrett IP, LLC

(57) ABSTRACT

Technologies are presented that allow a portion of a cache to be used as a front memory when there is dynamic need based on system demand. A computing system may include at least one processor, a memory controlled by a controller and communicatively coupled with the at least one processor, a cache communicatively coupled with the at least one processor and the memory, and mapping logic communicatively coupled with the at least one processor, the memory, and the cache. The mapping logic may map a portion of the cache to a portion of the memory, wherein the portion of the cache is to be used by the at least one processor as a local memory, and wherein the mapping is dynamic based on system demand and managed by the controller in a physical address domain.

25 Claims, 8 Drawing Sheets

DYNAMIC CACHE AND MEMORY ALLOCATION FOR MEMORY SUBSYSTEMS

TECHNICAL FIELD

The technologies described herein generally relate to data storage and retrieval in a computing system.

BACKGROUND

Some computer system applications have unique needs when it comes to memory subsystems. A graphics hardware usage model is one such example. Many graphics workloads demand high memory bandwidth with minimal latency. For example, graphics display engines may require a large sustained bandwidth with short latency to provide a real-time user experience (e.g., to avoid display delays and stuttering, etc.). A display engine's accesses to a frame buffer may not be sustained with a slow physical memory, given today's display resolutions with multiple displays. A large cache may address bandwidth demand, but known cache solutions may be unpredictable in performance where cache allocations may be bounded by cache replacement policies and may not guarantee a stable user experience. Known solutions attempt to ensure physical memory technologies have sufficient memory bandwidth and acceptable latency to ensure display performance. These known solutions favor more costly memory subsystems of either high bandwidth memory systems with separate caches, or dedicated local memory options with expensive technologies. However, with increased demand and cost pressure to keep up with such demand, these solutions are difficult to maintain.

BRIEF DESCRIPTION OF THE DRAWINGS/FIGURES

Figure 1:
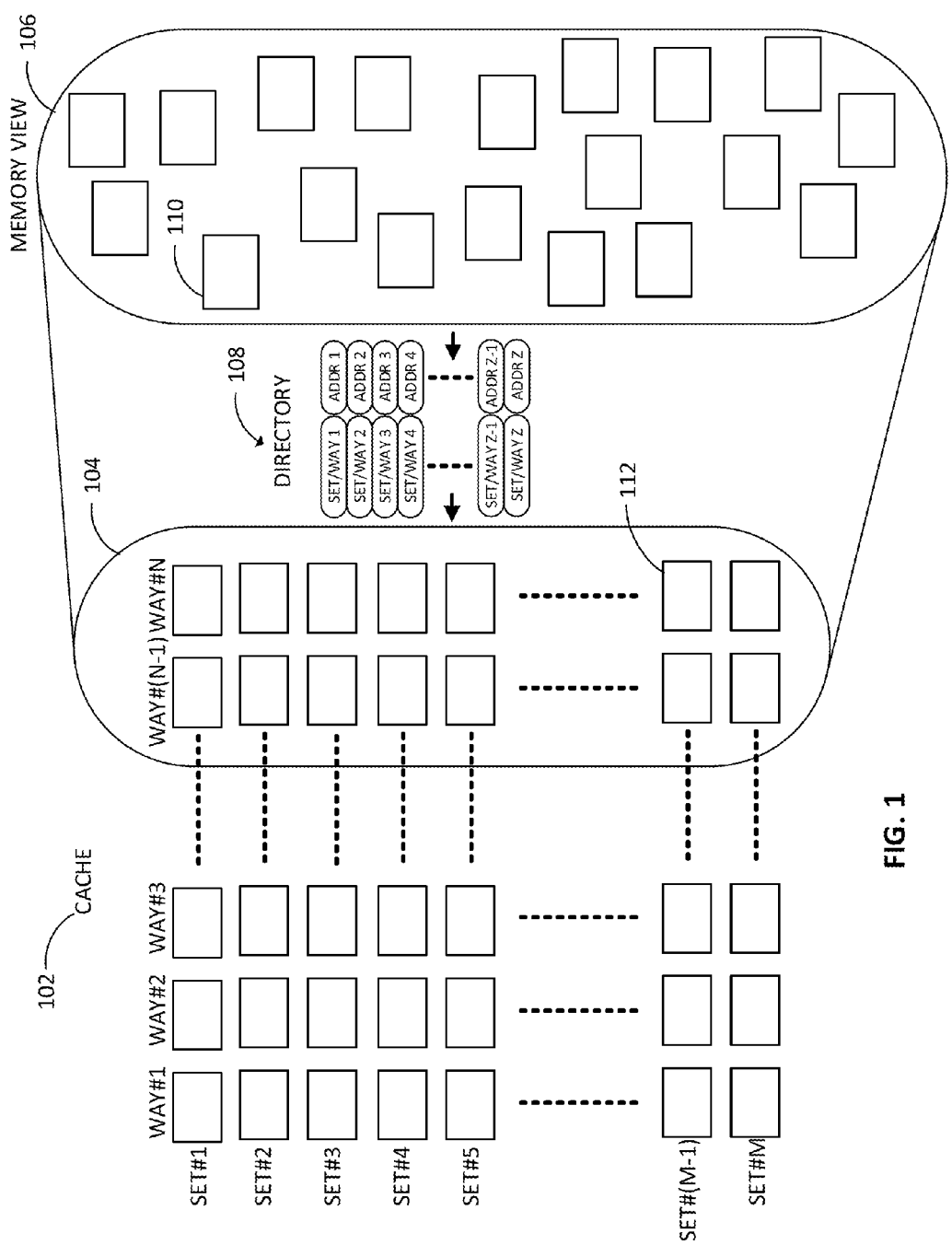
FIG. 1 is a block diagram of an example cache/memory structure with mapping of specific direct physical memory addresses to respective cache locations, according to an embodiment.

In the drawings, the leftmost digit(s) of a reference number may identify the drawing in which the reference number first appears.

DETAILED DESCRIPTION

In the embodiments described herein, a portion of a cache (for example, but not to be limited to, a high-performance cache) may be reserved and treated as a local, or front, memory rather than a cache in a memory subsystem (for example, but not to be limited to, a hierarchical memory subsystem). Cache allocations may be dynamic based on the system demand and may be managed in a physical address domain. The description discusses how data from one or more memory locations of a slower physical memory may be stored in this local memory, and how they are mapped and tracked by the system. The described technology addresses high throughput demand of processing blocks, such as graphics processing blocks, that may require a larger bandwidth that is not available using conventionally larger, cheaper memory technologies.

FIG. 1 is a block diagram of an example cache/memory structure with mapping of specific direct physical memory addresses to respective cache locations, according to an embodiment. In FIG. 1, the cache/memory structure includes a cache 102 having a portion 104 of cache 102 that, once mapped, corresponds to a memory subset 106 of physical memory addresses of a memory (not shown in FIG. 1). The memory may be implemented, for example, as a volatile memory device such as, but not limited to, a Random Access Memory (RAM), Dynamic Random Access Memory (DRAM), Static RAM (SRAM), etc., including currently developing and future types of memory. In the following described embodiments, each physical memory address of memory subset 106 may be mapped to a corresponding set/way location in the cache 102 using a mapping directory, or mapping logic, 108. For example, physical memory address 110 may correspond to set/way location 112 in mapping directory 108. Mapping directory 108 may be created and/or maintained based on system demand (e.g., as applications or tasks are launched and/or terminated). In this way, a portion of cache 102 may dynamically be made to look like a memory.

In order to allocate a portion of cache 102 to look like a memory, a software driver (e.g., a graphics driver for a graphics application) may communicate to a controller that controls the memory and cache a set of memory locations that are to be mapped to cache locations, for a specific application, for example. The set of memory locations may be, for example, critical memory locations, such as a frame buffer for graphics applications. Critical memory may be defined as a low latency sustainable bandwidth required portion of a physical memory that is needed for a specific application or task (e.g., graphics). Although the virtual address mapping of such memory may be contiguous, as shown by the logical cache view 104 (e.g., like a single buffer), the physical view of the same memory may be scattered to various non-contiguous memory locations, as shown in the memory view of memory subset 106. It should be noted that the implementation shown in FIG. 1 is one example configuration, though many other configurations may be contemplated. As would be understood by one of ordinary skill in the art, the cache view need not be contiguous. In addition, the memory locations of memory subset 106 may be managed with the same granularity as the cache, which may be, but is not to be limited to, 4 KB or greater memory pages down to 64 B lines or smaller.

Once the controller has the physical memory locations to be mapped to cache locations, it may dynamically allocate a portion of cache 102 to be mapped as a memory view of the data found in the communicated physical memory locations. These allocated locations may be removed from the cache allocation pool to prevent use by other applications, etc. In this way, further allocations and/or replacements per cache policies have no impact on these reserved cache locations.

Mapping logic, such as mapping directory 108, may be created and/or maintained that maps each physical memory address provided by the software driver to a set/way location of cache 102. The set/way locations comprise a cache view (e.g., cache view 104) of the corresponding mapped physical memory locations of memory subset 106. Mapping directory 108 may be built as the controller goes through the provided physical memory addresses, which may be a dynamic on-demand operation depending on the applications or tasks being run. In an embodiment, for each mapped memory location, a VALID bit or flag may be set in the mapping directory 108. Entries in the mapping directory may be removed from the mapping directory (i.e., those cache locations may be de-allocated) by the controller when those memory locations are no longer needed (e.g., when those memory locations are no longer considered critical memory). This de-allocation may occur, for example, when a software driver provides the controller with the memory locations that are no longer considered critical. In another example, de-allocation may occur when the application or task associated with those memory locations is terminated. In an embodiment, de-allocation may include clearing a set VALID bit or flag (e.g., setting the VALID bit to zero) in the mapping directory 108. The size of mapping directory 108 may be limited by a maximum amount of critical memory that may be needed by a system and therefore may be contained. Mapping directory 108 may be maintained within physical memory.

As long as mapping directory 108 is active (e.g., the application or task for which it exists is active), any memory access may be compared to valid entries in the mapping directory to determine whether the desired memory location is mapped to a front (cache) memory location as opposed to being only available in a slower physical memory location. Valid entries may each have an associated VALID bit or flag set, for example. The compare operation may be costly (in terms of processing time, power consumption, etc.) given the mapping directory may contain a very large number of memory locations that are deemed critical. In an embodiment, in order to reduce the impact of the compare operation while maintaining the latency of the memory access, the look-up in the mapping directory may be pipelined in multiple cycles (e.g., distributed over multiple clock cycles). Further, in embodiments, a directory look-up table may be created to minimize the latency impact and power consumption of a mapping directory look-up. A directory look-up table may maintain the most active memory locations (e.g., the most recent memory locations, the most frequently accessed memory locations, etc.) that are being accessed. The directory look-up table may be sized smaller than the mapping directory, but may significantly filter subsequent memory access to same locations, minimizing both processing time and power consumption.

Figure 2:
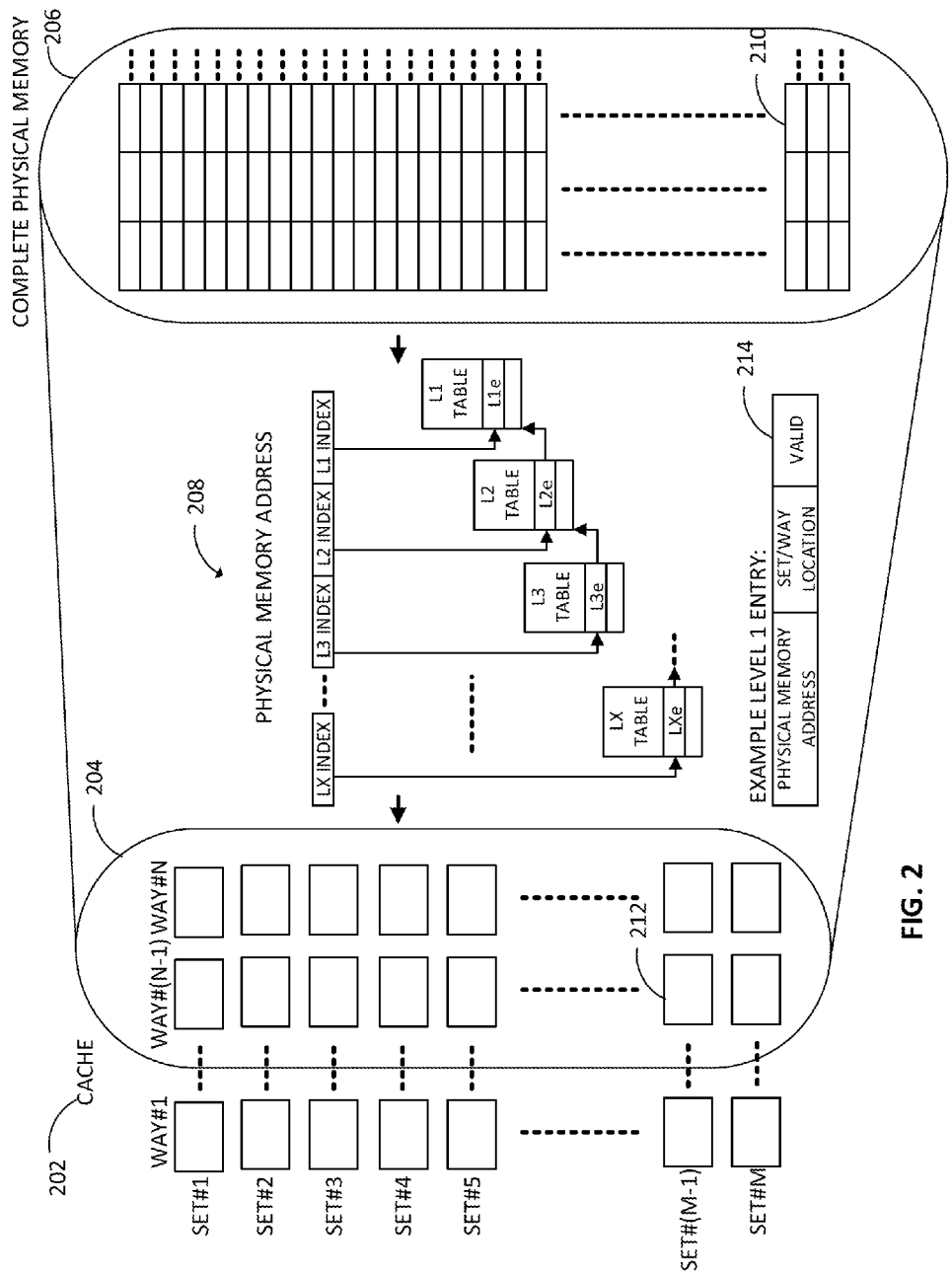
FIG. 2 is a block diagram of another example cache/memory structure with mapping of physical memory addresses of an entire physical memory to specific cache locations, according to an embodiment.

FIG. 2 is a block diagram of another example cache/memory structure with mapping of physical memory addresses of an entire physical memory to specific cache locations, according to an embodiment. The structure of FIG. 2 is similar to the structure of FIG. 1, except that a portion 204 of a cache 202 is mapped to correspond to all physical memory addresses of a memory 206. A mapping directory 208 may be flat (similar to mapping directory 108 in FIG. 1) or may be hierarchical as shown in FIG. 2 where levels L1 through LX include corresponding mapping tables. Using a hierarchical mapping directory may be more efficient than a flat directory in that the size may be better contained. Similar to the discussion of mapping table 108 above, mapping table 208 may, for example, map physical memory location 210 to set/way location 212 in cache 202. Also similar to mapping table 108, in mapping directory 208, critical physical memory locations may include a designation 214 of "VALID" in their entries to denote that the data may be found in corresponding set/way locations found in those entries. Upon a memory access, mapping directory 208 may be traversed using the physical memory address, and if there is an entry for that physical memory address denoted as "VALID" (e.g., via a set "VALID" flag or bit), data may be accessed from the corresponding set/way location of cache 202. If there is no valid entry, then data may be accessed from the physical memory location of memory 206. As discussed above, in order to reduce a costly look-up for every memory access, a mapping directory look-up table may be created and maintained that contains the most active memory locations (e.g., most recently accessed, most frequently accessed, etc.) that are in use. In the embodiment shown in FIG. 2, because the mapping directory encompasses the physical memory locations of the entire physical memory, the need for compare operations is eliminated, as the directory may be traversed using an indexed physical memory address of the desired physical memory location. Memory allocation for mapping directory 208 may depend on the size of the physical memory. For example, allowing a mapping directory size of about $\frac{1}{1000}^{th}$ of the physical memory may make it viable for limited physical memory systems.

Figure 3:
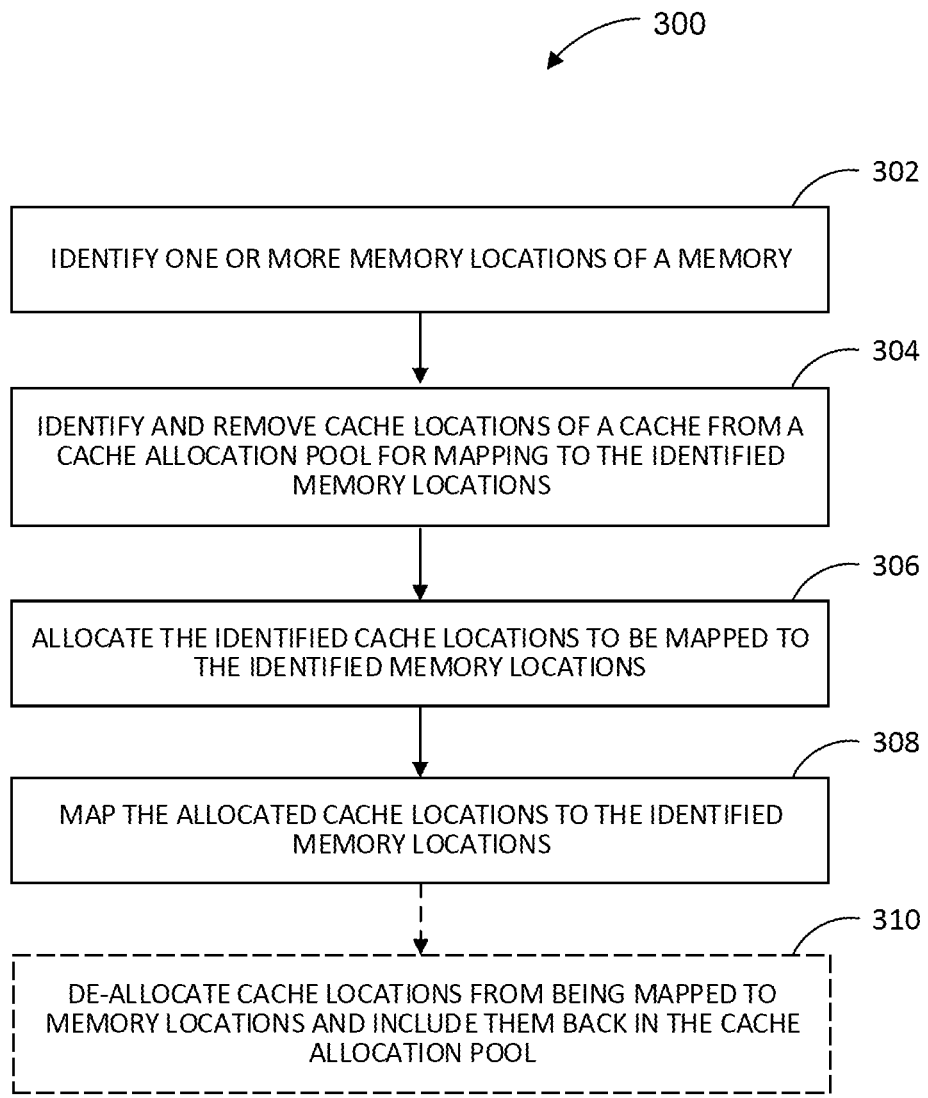
FIG. 3 is an example flow chart depicting allocation of cache locations, according to an embodiment.

FIG. 3 is an example flow chart 300 depicting allocation of cache locations, such as discussed above, according to an embodiment. The actions of flow chart 300 may be carried out by a controller, for example. In an example, these actions may be carried out as part of an initial setup operation of a particular application or task. At 302, one or more memory locations of a memory may be identified. For example, critical memory locations for a particular application (e.g., the frame buffer for a graphics application), may be identified. At 304, cache locations (of a cache) to be mapped to the identified memory locations may be identified and removed from a cache allocation pool (to prevent use by other applications or tasks). At 306, the identified cache locations may be allocated for mapping to the identified memory locations. At 308, the allocated cache locations may be mapped to the identified memory locations. The allocated cache locations may be mapped to the identified memory locations in a mapping directory, for example. In embodiments, valid mappings may be indicated by setting a VALID bit or flag in the mapping directory. If previously allocated cache locations are no longer needed, at 310, they may be de-allocated from being mapped to memory locations and put back into the cache allocation pool to be used by other applications or tasks. In embodiments, de-allocation may be accomplished by clearing a set VALID bit or flag in the mapping directory.

Figure 4:
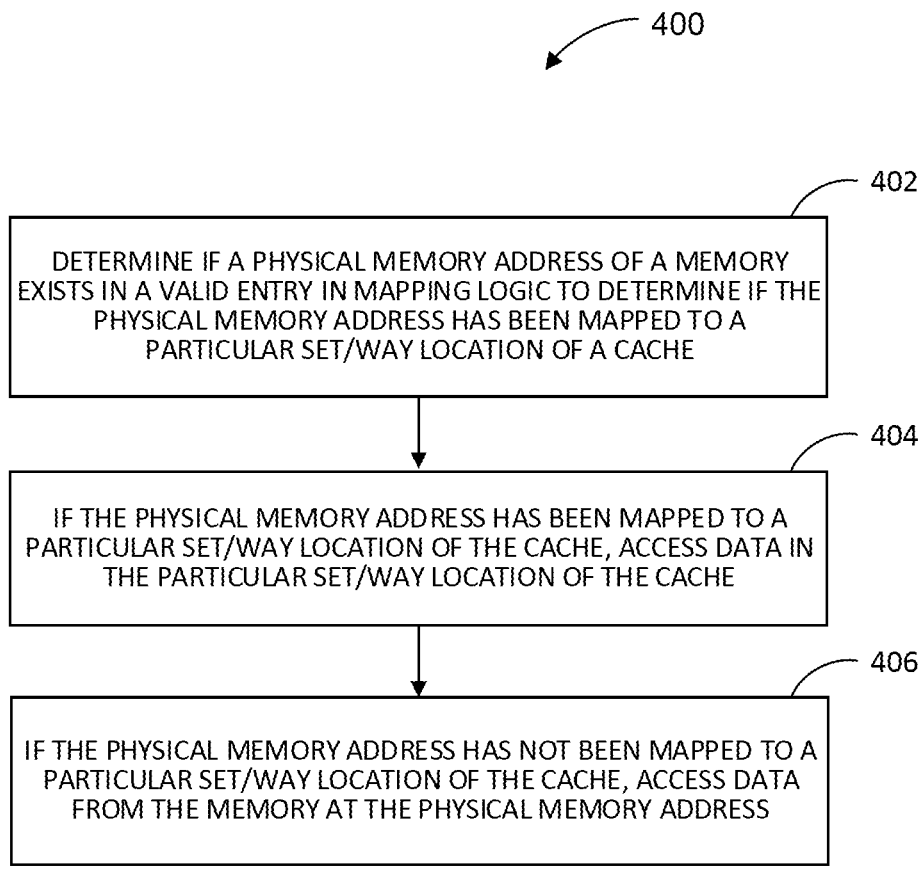
FIG. 4 is an example flow chart depicting a look-up operation, according to an embodiment.

FIG. 4 is an example flow chart 400 depicting a look-up operation, such as discussed above, according to an embodiment. The actions of flow chart 400 may be carried out by a controller, for example. At 402, it may be determined whether a physical memory address of a memory exists in a valid entry in a mapping directory or logic to determine if the physical memory address has been mapped to a particular set/way location of a cache. In an embodiment, this determination may be done using one or more compare operations. In an embodiment where every physical memory location is accounted for in the mapping directory, this determination may be done via indexing. At 404, if the physical memory address has been mapped to a particular set/way location of the cache, data in the particular set/way location of the cache may be accessed. At 406, if the physical memory address has not been mapped to a particular set/way location of the cache, data may be accessed from the memory at the physical memory address. To reduce the impact of compare operations (if used) while maintaining the latency of the memory access, the look-up operation may be pipelined in multiple cycles.

Figure 5:
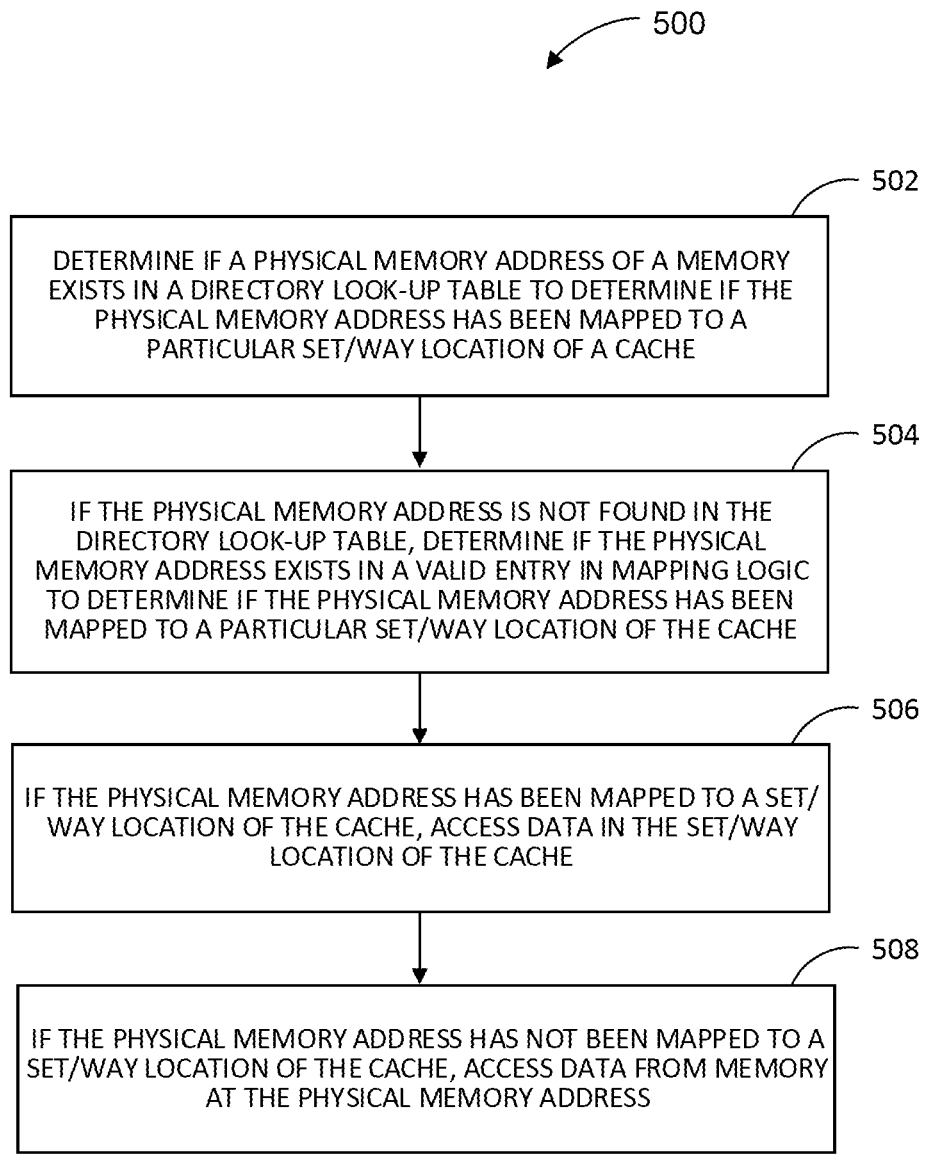
FIG. 5 is an example flow chart depicting a look-up operation using a directory look-up table, according to an embodiment.

FIG. 5 is an example flow chart 500 depicting a look-up operation using a directory look-up table, according to an embodiment. Flow chart 500 is similar to flow chart 400 except that the look-up involves first looking up the physical memory address in a directory look-up table that contains the most active (e.g., frequently accessed, or most recently accessed) mapped pairs of physical memory addresses and respective cache locations, which may speed up the search. The actions of flow chart 500 may be carried out by a controller, for example. At 502, it may be determined whether a physical memory address of a memory exists in a directory look-up table to determine if the physical memory address has been mapped to a particular set/way location of a cache. At 504, if the physical memory address is not found in the directory look-up table, it may be determined if the physical memory address exists as a valid entry in a mapping directory or logic to determine if the physical memory address has been mapped to a particular set/way location of the cache. At 506, if the physical memory address has been mapped to a set/way location of the cache per the directory look-up table or mapping directory, data in the set/way location of the cache may be accessed. At 508, if the physical memory address has not been mapped to a particular set/way location of the cache, the data may be accessed from memory at the physical memory address.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The terms software and firmware, as used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, SRAM, DRAM, a hard drive, a solid state drive, or other data storage device.

Figure 6:
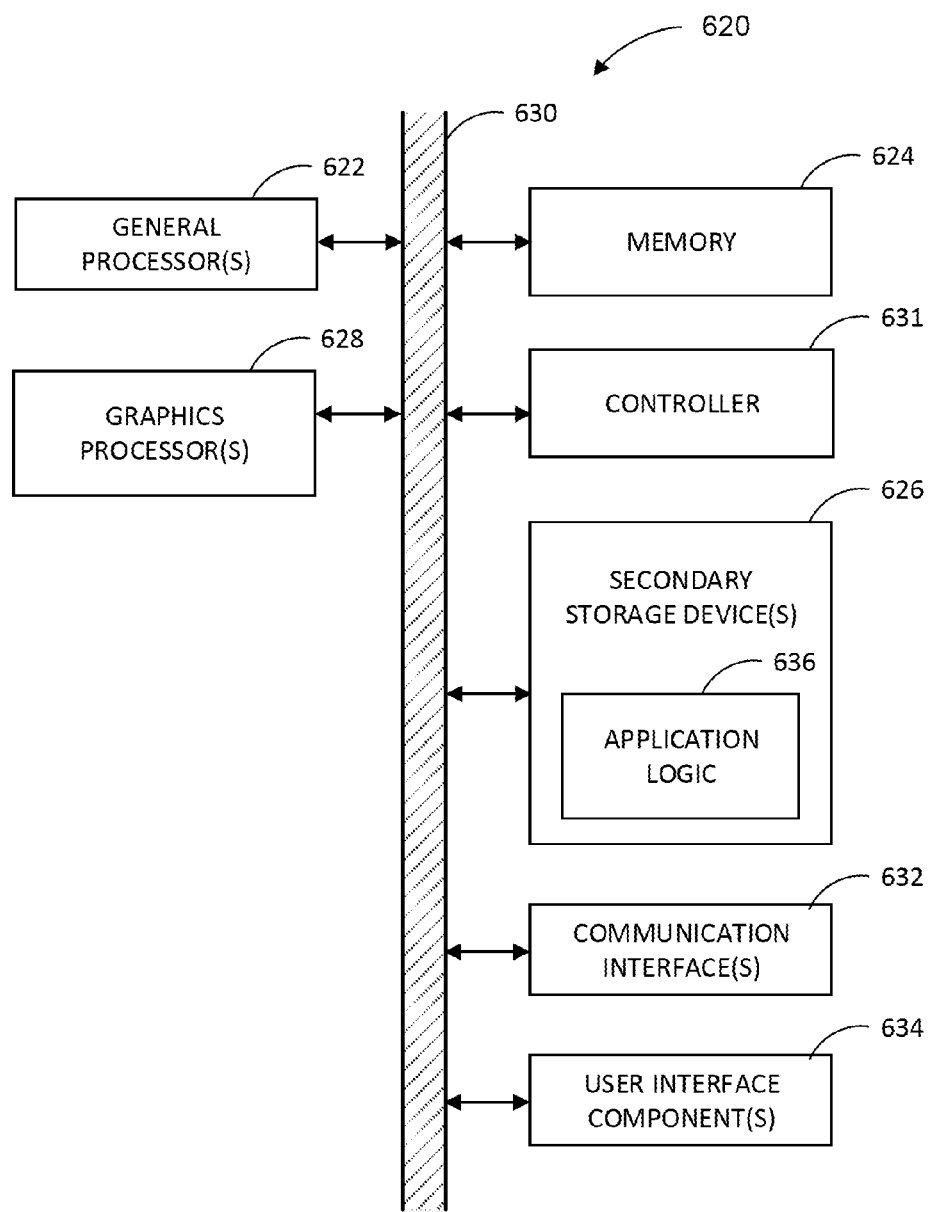
FIG. 6 is a block diagram of an example computing device, according to an embodiment.

As stated above, in embodiments, some or all of the processing described herein may be implemented as hardware, software, and/or firmware. Such embodiments may be illustrated in the context of an example computing system 620 as shown in FIG. 6. Computing system 620 may include one or more central processing unit(s) (CPU), such as one or more general processors 622, connected to memory 624, one or more secondary storage devices 626, and one or more graphics processors 628 by a link 630 or similar mechanism. In an embodiment, graphics processor(s) 628 (i.e., the graphics processor core) may be integrated with general processor(s) 622 (i.e., the processor core). The general processor(s) 622 and/or graphics processor(s) 628 may include one or more logic units for carrying out the methods described herein. In embodiments, other logic units may also be present. One skilled in the art would recognize that the functions of the logic units may be executed by a single logic unit, or any number of logic units. Memory 624 may be controlled by a controller 631. In an embodiment, the controller is a memory controller that may be embedded in a general processor 622 or graphics processor 628. In this embodiment, memory 624 may be connected to the processor via the memory controller.

Computing system 620 may optionally include communication interface(s) 632 and/or user interface components 634. The communication interface(s) 632 may be implemented in hardware or a combination of hardware and software, and may provide a wired or wireless network interface to a network. The user interface components 634 may include, for example, a touchscreen, a display, one or more user input components (e.g., a keyboard, a mouse, etc.), a speaker, or the like, or any combination thereof. Data and/or graphics processed via the methods described herein may be displayed on one or more user interface components. The one or more secondary storage devices 626 may be, for example, one or more hard drives or the like, and may store logic 636 (e.g., application logic) to be executed by graphics processor(s) 628 and/or general processor(s) 622. In an embodiment, general processor(s) 622 and/or graphics processor(s) 628 may be microprocessors, and logic 636 may be stored or loaded into memory 624 for execution by general processor(s) 622 and/or graphics processor(s) 628 to provide the functions described herein. Note that while not shown, computing system 620 may include additional components.

Figure 7:
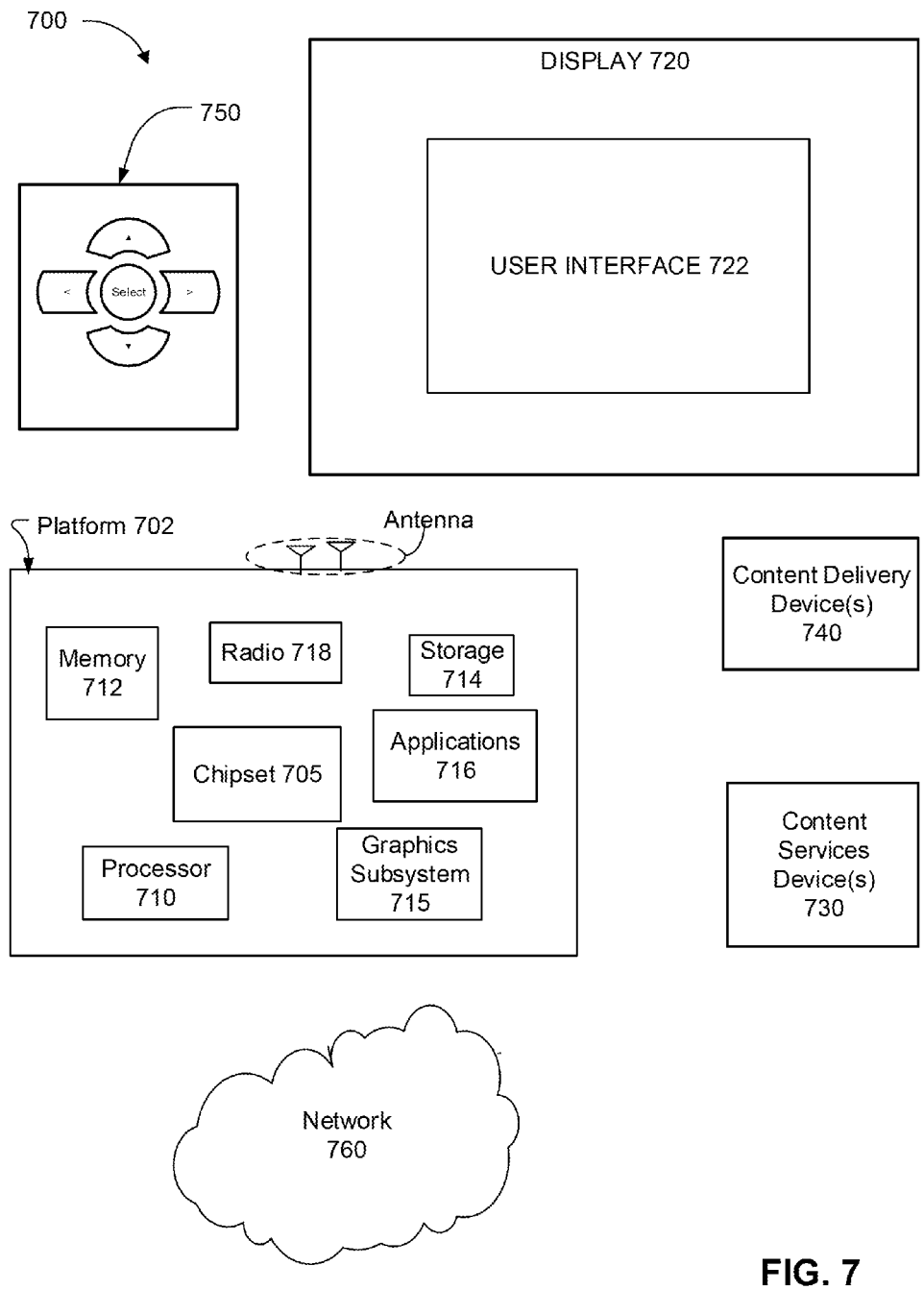
FIG. 7 illustrates an example information system in which an embodiment may be implemented.

The technology described above may be a part of a larger information system. FIG. 7 illustrates such an embodiment, as a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled with a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled with chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area networks (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled with platform 702 and/or to display 720. Platform 702 and/or content services device(s) 730 may be coupled with a network 760 to communicate (e.g., send and/or receive) media information to and from network 760. Content delivery device(s) 740 also may be coupled with platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of this disclosure.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the embodiments discussed in this disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
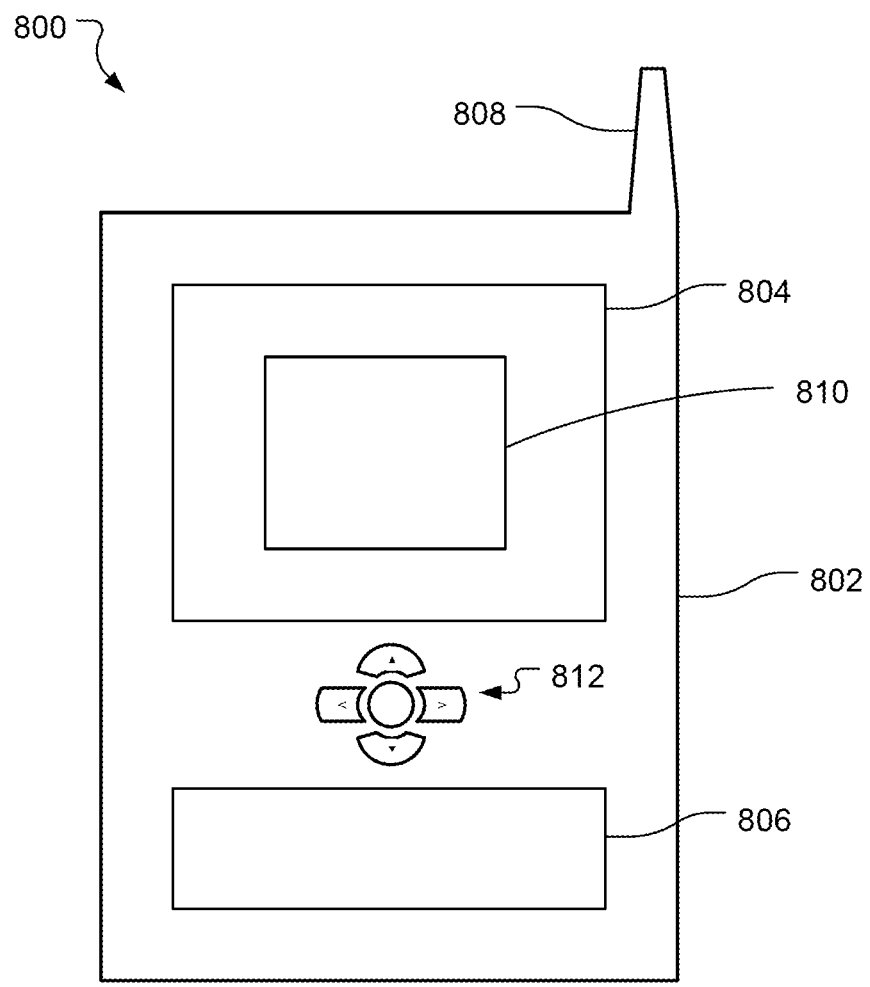
FIG. 8 illustrates an example mobile information device in which an embodiment may be implemented.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may comprise a housing 802, a display 804, an input/output (I/O) device 806, and an antenna 808. Device 800 also may comprise navigation features 812. Display 804 may comprise any suitable display unit for displaying information 810 appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition devices and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Technologies disclosed herein allow a portion of a cache to be reserved and treated as a local memory rather than a cache. Cache allocations may be dynamic based on the system demand and may be managed in a physical address domain. The solutions provided herein address how one or more memory locations of a slower physical memory may be stored in this local memory, and how they are mapped and tracked by the system. The described embodiments are capable of handling high throughput demand of processing blocks, such as graphics processing blocks, that may require a larger bandwidth that is not available using conventionally larger, cheaper memory technologies. The particular examples and scenarios used in this document are for ease of understanding and are not to be limiting. Features described herein may be used in many other contexts, as would be understood by one of ordinary skill in the art. For example, concepts described herein may be applied to any type of computer processing, such as, but not to be limited to, general processing, graphics processing, etc.

There are various advantages of using the technologies described herein. For example, the embodiments described herein provide high bandwidth, yet low latency, solutions for high performance applications, allowing for fast real-time user experiences in the case of graphics applications, etc. In addition, the mapping of memory locations to cache locations may occur dynamically, depending on the need of the applications, which allows the cache to scale as needed. Many other advantages may also be contemplated.

The following examples pertain to further embodiments.

Example 1 may include a computing system, comprising at least one processor; a memory controlled by a controller and communicatively coupled with the at least one processor; a cache communicatively coupled with the at least one processor and the memory; and mapping logic communicatively coupled with the at least one processor, the memory, and the cache, to map a portion of the cache to a portion of the memory, wherein the portion of the cache is to be used by the at least one processor as a local memory, and wherein the mapping is dynamic based on system demand and managed by the controller in a physical address domain.

Example 2 may include the subject matter of Example 1, wherein the portion of the memory that is mapped to the portion of the cache is critical memory of a graphics system.

Example 3 may include the subject matter of Example 2, wherein the critical memory is a frame buffer.

Example 4 may include the subject matter of any one of Examples 1-3, wherein the controller is to dynamically maintain the mapping logic, based on the system demand, by: identifying one or more memory locations of the memory; identifying and removing cache locations of the cache from a cache allocation pool for mapping to the identified memory locations; allocating the identified cache locations to be mapped to the identified memory locations; and mapping the allocated cache locations to the identified memory locations.

Example 5 may include the subject matter of Example 4, wherein the controller is further to de-allocate cache locations from being mapped to memory locations based on the system demand.

Example 6 may include the subject matter of any one of Examples 1-5, wherein the mapping of the portion of the cache to the portion of the memory includes mapping at least one physical memory address to an associated set/way location of the cache.

Example 7 may include the subject matter of Example 6, wherein the controller is further to execute a memory access task to access data located at a particular physical memory address by: determining if the particular physical memory address exists in a valid entry in the mapping logic to determine if the particular physical memory address has been mapped to a particular set/way location of the cache; if the particular physical memory address has been mapped to the particular set/way location of the cache, accessing the data in the particular set/way location of the cache; and if the particular physical memory address has not been mapped to the particular set/way location of the cache, accessing the data from memory at the particular physical memory address.

Example 8 may include the subject matter of Example 7, wherein the determining is pipelined into multiple clock cycles.

Example 9 may include the subject matter of Example 6, wherein the mapping of the portion of the cache to the portion of the memory further includes creating and maintaining a directory look-up table to map most frequently accessed physical memory addresses to their associated set/way locations of the cache.

Example 10 may include the subject matter of Example 9, wherein the controller is further to execute a memory access task to access data located at a particular physical memory address by: determining if the particular physical memory address exists in the directory look-up table to determine if the particular physical memory address has been mapped to a particular set/way location of the cache; if the particular physical memory address is not found in the directory look-up table, determining if the particular physical memory address exists in a valid entry in the mapping logic to determine if the particular physical memory address has been mapped to a particular set/way location of the cache; if the particular physical memory address has been mapped to the particular set/way location of the cache, accessing data in the particular set/way location of the cache; and if the particular physical memory address has not been mapped to the particular set/way location of the cache, accessing the data from memory at the particular physical memory address.

Example 11 may include the subject matter of Example 9 or Example 10, wherein the directory look-up table is further to map most recently accessed physical memory addresses to their associated set/way locations of the cache.

Example 12 may include the subject matter of any one of Examples 6-11, wherein every physical memory address of the memory is to be mapped to an associated set/way location of the cache.

Example 13 may include the subject matter of Example 12, wherein the mapping logic is flat.

Example 14 may include the subject matter of Example 12, wherein the mapping logic is hierarchical.

In Example 15, any one of Examples 1-14 may optionally include a communication interface communicatively coupled with the at least one processor and a network; a user interface including a navigation device and display, the user interface communicatively coupled with the at least one processor; and storage that stores application logic, the storage communicatively coupled with the at least one processor, wherein the at least one processor is to load and execute the application logic, wherein the execution of the application logic includes presenting graphics via the user interface.

Example 16 may include at least one computer program product, including at least one computer readable medium having computer program logic stored therein, the computer program logic including logic to cause a controller to: identify one or more memory locations of a memory; identify and remove cache locations of a cache from a cache allocation pool for mapping to the identified memory locations; allocate the identified cache locations to be mapped to the identified memory locations; and map the allocated cache locations to the identified memory locations, wherein the identifying, identifying and removing, allocating, and mapping are dynamically executed based on system demand.

Example 17 may include the subject matter of Example 16, wherein the computer program logic further includes logic to cause the controller to de-allocate cache locations from being mapped to memory locations based on the system demand.

Example 18 may include the subject matter of Example 16 or Example 17, wherein the computer program logic further includes logic to cause the controller to create and maintain mapping logic in which at least one physical memory address of the memory is to be mapped to an associated set/way location of the cache.

Example 19 may include the subject matter of Example 18, wherein the computer program logic further includes logic to cause the controller to execute a memory access task to access data located at a particular physical memory address of the memory, the memory access task including: determining if the particular physical memory address exists in a valid entry in the mapping logic to determine if the particular physical memory address of the memory has been mapped to a particular set/way location of the cache; if the particular physical memory address has been mapped to the particular set/way location of the cache, accessing the data in the particular set/way location of the cache; and if the particular physical memory address has not been mapped to the particular set/ way location of the cache, accessing the data from the memory at the particular physical memory address.

Example 20 may include the subject matter of Example 18, wherein the computer program logic further includes logic to cause the controller to create and maintain a directory look-up table that is to map most frequently accessed physical memory addresses to their associated set/way locations of the cache.

Example 21 may include the subject matter of Example 20, wherein the computer program logic further includes logic to cause the controller to execute a memory access task to access data located at a particular physical memory address of the memory, the memory access task including: determining if the particular physical memory address exists in the directory look-up table to determine if the particular physical memory address has been mapped to a particular set/way location of the cache; if the particular physical memory address is not found in the directory look-up table, determining if the particular physical memory address exists in a valid entry in the mapping logic to determine if the particular physical memory address has been mapped to a particular set/way location of the cache; if the particular physical memory address has been mapped to the particular set/way location of the cache, accessing data in the particular set/way location of the cache; and if the particular physical memory address has not been mapped to the particular set/way location of the cache, accessing the data from memory at the particular physical memory address.

Example 22 may include the subject matter of Example 20 or Example 21, wherein the directory look-up table further is to map most recently accessed physical memory addresses to their associated set/way locations of the cache.

Example 23 may include the subject matter of any one of Examples 18-22, wherein every physical memory address of the memory is to be mapped to an associated set/way location of the cache in the mapping logic.

Example 24 may include an apparatus for processing data, comprising: means for identifying one or more memory locations of a memory; means for identifying and removing cache locations of a cache from a cache allocation pool for mapping to the identified memory locations; means for allocating the identified cache locations to be mapped to the identified memory locations; and means for mapping the allocated cache locations to the identified memory locations, wherein the identifying, identifying and removing, allocating, and mapping are dynamically executed based on system demand.

In Example 25, Example 24 may optionally include means for de-allocating cache locations from being mapped to memory locations based on the system demand.

Example 26 may include the subject matter of Example 24 or Example 25, wherein the means for mapping includes means for creating and maintaining mapping logic in which at least one physical memory address of the memory is to be mapped to an associated set/way location of the cache.

In Example 27, Example 26 may optionally include means for executing a memory access task to access data located at a particular physical memory address of the memory, the means for executing the memory access task including means for determining if the particular physical memory address exists in a valid entry in the mapping logic to determine if the particular physical memory address of the memory has been mapped to a particular set/way location of the cache; means for accessing the data in the particular set/way location of the cache if the particular physical memory address has been mapped to the particular set/way location of the cache; and means for accessing the data from the memory at the particular physical memory address if the particular physical memory address has not been mapped to the particular set/way location of the cache.

In Example 28, Example 26 may optionally include means for creating and maintaining a directory look-up table that is to map most frequently accessed physical memory addresses to their associated set/way locations of the cache.

In Example 29, Example 28 may optionally include means for executing a memory access task to access data located at a particular physical memory address of the memory, the means for executing the memory access task including means for determining if the particular physical memory address exists in the directory look-up table to determine if the particular physical memory address has been mapped to a particular set/way location of the cache; means for determining if the particular physical memory address exists in a valid entry in the mapping logic to determine if the particular physical memory address has been mapped to a particular set/way location of the cache if the particular physical memory address is not found in the directory look-up table; means for accessing data in the particular set/way location of the cache if the particular physical memory address has been mapped to the particular set/way location of the cache; and means for accessing the data from memory at the particular physical memory address if the particular physical memory address has not been mapped to the particular set/way location of the cache.

Example 30 may include the subject matter of Example 28 or Example 29, wherein the means for creating and maintaining the directory look-up table includes means for mapping most recently accessed physical memory addresses to their associated set/way locations of the cache.

Example 31 may include the subject matter of any one of Examples 26-30, wherein every physical memory address of the memory is to be mapped to an associated set/way location of the cache in the mapping logic.

Example 32 may include a method of processing data, comprising: identifying, by a controller, one or more memory locations of a memory; identifying and removing, by the controller, cache locations of a cache from a cache allocation pool for mapping to the identified memory locations; allocating, by the controller, the identified cache locations to be mapped to the identified memory locations; and mapping, by the controller, the allocated cache locations to the identified memory locations, wherein the identifying, identifying and removing, allocating, and mapping are dynamically executed based on system demand.

In Example 33, Example 32 may optionally include de-allocating cache locations from being mapped to memory locations based on the system demand.

Example 34 may include the subject matter of Example 32 or Example 33, wherein the mapping includes creating and maintaining mapping logic in which at least one physical memory address of the memory is to be mapped to an associated set/way location of the cache.

In Example 35, Example 34 may optionally include executing a memory access task to access data located at a particular physical memory address of the memory, the memory access task including: determining if the particular physical memory address exists in a valid entry in the mapping logic to determine if the particular physical memory address of the memory has been mapped to a particular set/way location of the cache; if the particular physical memory address has been mapped to the particular set/way location of the cache, accessing the data in the particular set/way location of the cache; and if the particular physical memory address has not been mapped to the particular set/way location of the cache, accessing the data from the memory at the particular physical memory address.

In Example 36, Example 34 may optionally include creating and maintaining a directory look-up table that is to map most frequently accessed physical memory addresses to their associated set/way locations of the cache.

In Example 37, Example 36 may optionally include executing a memory access task to access data located at a particular physical memory address of the memory, the memory access task including: determining if the particular physical memory address exists in the directory look-up table to determine if the particular physical memory address has been mapped to a particular set/way location of the cache; if the particular physical memory address is not found in the directory look-up table, determining if the particular physical memory address exists in a valid entry in the mapping logic to determine if the particular physical memory address has been mapped to a particular set/way location of the cache; if the particular physical memory address has been mapped to the particular set/way location of the cache, accessing data in the particular set/way location of the cache; and if the particular physical memory address has not been mapped to the particular set/way location of the cache, accessing the data from memory at the particular physical memory address.

Example 38 may include the subject matter of Example 36 or Example 37, wherein the creating and maintaining the directory look-up table further includes mapping most recently accessed physical memory addresses to their associated set/way locations of the cache.

Example 39 may include the subject matter of any one of Examples 34-38, wherein the creating and maintaining the mapping logic further includes mapping every physical memory address to an associated set/way location of the cache.

Example 40 may include at least one machine readable medium comprising a plurality of instructions that in response to being executed on a computing device, cause the computing device to carry out a method according to any one of Examples 32-39.

Example 41 may include an apparatus to perform the method of any one of Examples 32-39.

Example 42 may include a computer system to perform the method of any one of Examples 32-39.

Example 43 may include a machine to perform the method of any one of Examples 32-39.

Example 44 may include an apparatus comprising means for performing the method of any one of Examples 32-39.

Example 45 may include a computing device comprising memory and a chipset to perform the method of any one of Examples 32-39.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the scope of the methods and systems disclosed herein. Thus, the breadth and scope of the claims should not be limited by any of the exemplary embodiments disclosed herein.

As used in this application and in the claims, a list of items joined by the term "one or more of" can mean any combination of the listed terms. For example, the phrases "one or more of A, B or C" and "one or more of A, B, and C" can mean A; B; C; A and B; A and C; B and C; or A, B and C.

What is claimed is:

1. A method, comprising:
receiving a list of physical addresses referenced in a computer program executing on a processor;
allocating cache of the processor to the list of physical addresses, including mapping the list of physical addresses to locations within the cache in a mapping directory, and disassociating the locations of the cache from a cache allocation pool; and
processing a memory access request of the computer program, including,
accessing a location within the cache if the mapping directory contains a valid mapping between a physical address of the request and the location, and
accessing physical memory based on the physical address of the request if the mapping directory does not contain a valid mapping for the physical address of the request.

2. The method of claim 1, wherein the computer program is configured to provide the list of physical addresses as a subset of physical addresses referenced in the computer program for which memory access requests are to be handled with lower latency and/or higher bandwidth relative to memory access requests directed to other physical addresses referenced by the computer program.

3. The method of claim 1, wherein:
the computer program includes a video driver;
the list of physical addresses includes one or more physical addresses with which the video driver accesses a graphics frame buffer; and
the mapping includes mapping the one or more physical addresses with which the video driver accesses the graphics frame buffer to the cache in the mapping directory.

4. The method of claim 1, wherein:
the mapping includes adding and removing physical addresses to and from the mapping directory during execution of the computer program based on needs of the computer program; and
the processing further includes comparing the physical address of the request to physical addresses of the mapping directory to determine if the mapping directory contains a mapping for the physical address of the request.

5. The method of claim 4, wherein:
the mapping further includes mapping the list of physical addresses to the cache in a hardware-based mapping directory;
the comparing includes comparing the physical address of the request to physical addresses of the hardware-based mapping directory in a hardware-based pipeline; and
the accessing a location within the cache is performed in hardware.

6. The method of claim 1, wherein the mapping directory includes mappings between physical addresses of the physical memory and the cache, and wherein:
the mapping includes tagging a subset of the mappings of the mapping directory that correspond to the list of physical addressed referenced in the computer program, as valid;

the processing further includes traversing an index of the physical addresses of the mapping directory to identify the mapping that corresponds to the physical address of the request;

the accessing a location within the cache includes accessing a location to which the physical address is mapped in the identified mapping if the identified mapping is tagged as valid; and accessing the physical memory based on the physical address of the request if the identified mapping is not tagged as valid.

7. The method of claim 6, wherein:
the mapping directory is configured as a hardware-based mapping directory that includes hardware-based mappings between the physical addresses of the physical memory and the cache; and
the traversing and the accessing a location with the cache are performed in hardware.

8. The method of claim 1, wherein:
the mapping includes mapping the list of physical addresses to the cache in a hardware-based mapping directory;
the processing includes determining if the hardware-based mapping directory contains a valid mapping for the physical address of the request, in hardware; and
the accessing a location within the cache is performed in the hardware.

9. The method of claim 1, wherein:
the allocating further includes maintaining a subset of mappings of the mapping directory in a look-up table based on of activity associated with the respective mappings of the mapping directory; and
the processing further includes determining if the look-up table contains a valid mapping for the physical address of the request, and determining if the mapping directory contains a mapping for the physical address of the request if the look-up table does not contain a mapping for the physical address of the request.

10. The method of claim 9, wherein:
the mapping includes mapping the list of physical addresses to locations within the cache in a hardware-based mapping directory;
the maintaining includes maintaining the subset of mappings of the hardware-based mapping directory in a hardware-based look-up table;
the determining with respect to the hardware-based look-up table and the determining with respect to hardware-based mapping directory are performed in hardware; and
the accessing a location within the cache is performed in the hardware.

11. An apparatus, comprising a processor, physical memory, and hardware, wherein one or more of the processor and the hardware is configured to:
allocate cache of the processor to a list of physical addresses referenced by a computer program configured to execute on the processor, including to map the list of physical addresses to locations within the cache in a mapping directory and to disassociate the locations of the cache from a cache allocation pool; and
process a memory access request of the computer program when it executes on the processor, including to,
access a location within the cache if the mapping directory contains a valid mapping between a physical address of the request and the location, and
access the physical memory based on the physical address of the request if the mapping directory does not contain a valid mapping for the physical address of the request.

12. The apparatus of claim 11, wherein the computer program is configured to provide the list of physical addresses as a subset of physical addresses referenced in the computer program for which memory access requests are to be handled with lower latency and/or higher bandwidth relative to memory access requests directed to other physical addresses referenced by the computer program.

13. The apparatus of claim 11, wherein:
the computer program includes a video driver;
the list of physical addresses includes one or more physical addresses with which the video driver accesses a graphics frame buffer; and
the mapping includes mapping the one or more physical addresses with which the video driver accesses the graphics frame buffer to the cache in the mapping directory.

14. The apparatus of claim 11, wherein one or more of the processor and the hardware is further configured to:
add and remove physical addresses to and from the mapping directory during execution of the computer program based on needs of the computer program; and
compare the physical address of the request to physical addresses of the mapping directory to determine if the mapping directory contains a mapping for the physical address of the request.

15. The apparatus of claim 14, wherein the hardware includes:
a hardware-based mapping directory to map the list of physical addresses to the cache;
a hardware-based pipeline to compare the physical address of the request to physical addresses of the hardware-based mapping directory to determine if the mapping directory contains a valid mapping for the physical address of the request; and
hardware to access the location within the cache if the mapping directory contains a valid mapping between the physical address of the request and the location.

16. The apparatus of claim 11, wherein the mapping directory includes mappings between physical addresses of the physical memory and the cache, and wherein one or more of the processor and the hardware is further configured to:
tag a subset of the mappings of the mapping directory that correspond to the list of physical addressed referenced in the computer program, as valid;
traverse an index of the physical addresses of the mapping directory to identify the mapping that corresponds to the physical address of the request;
access a location to which the physical address is mapped in the identified mapping if the identified mapping is tagged as valid; and
access the physical memory based on the physical address of the request if the identified mapping is not tagged as valid.

17. The apparatus of claim 16, wherein:
the mapping directory is configured as a hardware-based mapping directory that includes hardware-based mappings between the physical addresses of the physical memory and the cache;
the hardware is configured to traverse the index of the physical addresses of the mapping directory to identify the mapping that corresponds to the physical address of the request, and to access the location to which the physical address is mapped in the identified mapping if the identified mapping is tagged as valid.

18. The apparatus of claim 11, wherein:
the mapping directory is configured as a hardware-based mapping directory; and
the hardware is configured to determine if the hardware-based mapping directory contains a valid mapping for the physical address of the request, and to access the location within the cache.

19. The apparatus of claim 11, wherein one or more of the processor and the hardware is further configured to:
maintain a subset of mappings of the mapping directory in a look-up table based on of activity associated with the respective mappings of the mapping directory;
determine if the look-up table contains a valid mapping for the physical address of the request; and
determine if the mapping directory contains a mapping for the physical address of the request if the look-up table does not contain a mapping for the physical address of the request.

20. A non-transitory computer readable medium encoded with a first computer program that includes instructions to cause a processor to:
allocate cache of the processor to a list of physical addresses referenced by a second computer program configured to execute on the processor, including to map the list of physical addresses to locations within the cache in a mapping directory and to disassociate the locations of the cache from a cache allocation pool; and
process a memory access request of the second computer program when it executes on the processor, including to,
access a location within the cache if the mapping directory contains a valid mapping between a physical address of the request and the location, and
access the physical memory based on the physical address of the request if the mapping directory does not contain a valid mapping for the physical address of the request.

21. The non-transitory computer readable medium of claim 20, wherein the second computer program is configured to provide the list of physical addresses as a subset of physical addresses referenced in the second computer program for which memory access requests are to be handled with lower latency and/or higher bandwidth relative to memory access requests directed to other physical addresses referenced by the second computer program.

22. The non-transitory computer readable medium of claim 20, wherein:
the second computer program includes a video driver;
the list of physical addresses includes one or more physical addresses with which the video driver accesses a graphics frame buffer; and
the mapping includes mapping the one or more physical addresses with which the video driver accesses the graphics frame buffer to the cache in the mapping directory.

23. The non-transitory computer readable medium of claim 20, further including instructions to cause the processor to:
add and remove physical addresses to and from the mapping directory during execution of the computer program based on needs of the computer program; and
compare the physical address of the request to physical addresses of the mapping directory to determine if the mapping directory contains a mapping for the physical address of the request.

24. The non-transitory computer readable medium of claim 20, wherein the mapping directory includes mappings between physical addresses of the physical memory and the cache, further including instructions to cause the processor to:
tag a subset of the mappings of the mapping directory that correspond to the list of physical addressed referenced in the computer program, as valid;
traverse an index of the physical addresses of the mapping directory to identify the mapping that corresponds to the physical address of the request;
access a location to which the physical address is mapped in the identified mapping if the identified mapping is tagged as valid; and
access the physical memory based on the physical address of the request if the identified mapping is not tagged as valid.

25. The non-transitory computer readable medium of claim 20, further including instructions to cause the processor to:
maintain a subset of mappings of the mapping directory in a look-up table based on of activity associated with the respective mappings of the mapping directory;
determine if the look-up table contains a valid mapping for the physical address of the request; and
determine if the mapping directory contains a mapping for the physical address of the request if the look-up table does not contain a mapping for the physical address of the request.

* * * * *